(12) United States Patent
Han

(10) Patent No.: US 9,769,388 B2
(45) Date of Patent: Sep. 19, 2017

(54) METHOD AND APPARATUS FOR COMPOSITING IMAGE BY USING MULTIPLE FOCAL LENGTHS FOR ZOOMING IMAGE

(71) Applicant: SAMSUNG ELECTRONICS CO., LTD., Suwon-si (KR)

(72) Inventor: Hee-chul Han, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 102 days.

(21) Appl. No.: 14/600,775

(22) Filed: Jan. 20, 2015

(65) Prior Publication Data
US 2015/0207999 A1    Jul. 23, 2015

(30) Foreign Application Priority Data
Jan. 17, 2014  (KR) .......................... 10-2014-0006258

(51) Int. Cl.
H04N 5/232   (2006.01)
H04N 5/235   (2006.01)
H04N 5/262   (2006.01)

(52) U.S. Cl.
CPC ....... *H04N 5/23296* (2013.01); *H04N 5/2356* (2013.01); *H04N 5/23229* (2013.01); *H04N 5/2621* (2013.01)

(58) Field of Classification Search
CPC ........... H04N 5/23229; H04N 5/23296; H04N 5/2356; H04N 5/2621
See application file for complete search history.

(56) References Cited

U.S. PATENT DOCUMENTS

| 7,102,686 B1* | 9/2006 | Orimoto ................ G03B 35/08 348/231.7 |
| 2002/0180759 A1* | 12/2002 | Park ....................... G06T 3/0012 345/629 |
| 2003/0151679 A1* | 8/2003 | Amerson ........... H04N 5/23212 348/231.6 |
| 2005/0128323 A1* | 6/2005 | Choi ...................... G03B 29/00 348/239 |
| 2008/0030592 A1* | 2/2008 | Border ................... H04N 5/232 348/218.1 |
| 2010/0013906 A1* | 1/2010 | Border ................. H04N 5/2259 348/36 |
| 2010/0231734 A1* | 9/2010 | Cai .................... H04N 5/23206 348/218.1 |
| 2011/0310218 A1* | 12/2011 | Harding ................ G02B 15/02 348/36 |
| 2012/0075489 A1* | 3/2012 | Nishihara .......... H04N 5/23296 348/222.1 |
| 2013/0258044 A1 | 10/2013 | Betts-Lacroix |
| 2014/0218550 A1* | 8/2014 | Chuang ............. H04N 5/23229 348/208.6 |

\* cited by examiner

Primary Examiner — Amy Hsu
(74) Attorney, Agent, or Firm — Sughrue Mion, PLLC

(57) ABSTRACT

Provided are an image zooming method and an image zooming apparatus for optical zooming by using a plurality of lenses with different focal lengths. The image zooming method includes capturing an identical scene via a plurality of lenses; obtaining a first image and a second image of the identical scene that have different resolving powers; determining a first area of the first image and a second area of the second image which corresponds to the first area; and generating a composite image the second area and a remaining area of the first image from which the first area is excluded.

4 Claims, 8 Drawing Sheets

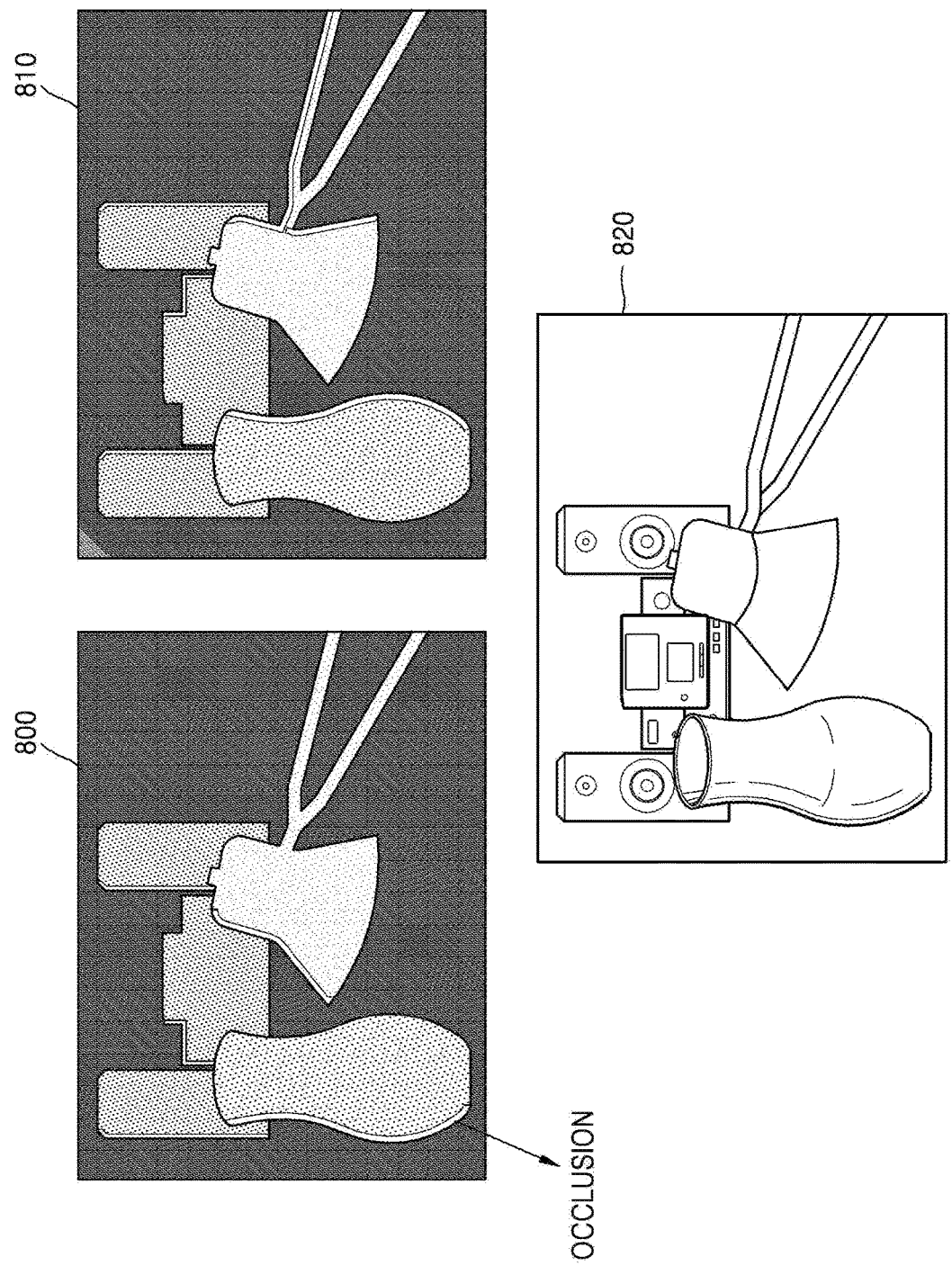

METHOD AND APPARATUS FOR COMPOSITING IMAGE BY USING MULTIPLE FOCAL LENGTHS FOR ZOOMING IMAGE

CROSS-REFERENCE TO RELATED APPLICATION

This application claims priority from Korean Patent Application No. 10-2014-0006258, filed on Jan. 17, 2014 in the Korean Intellectual Property Office, the disclosure of which is incorporated herein in its entirety by reference.

BACKGROUND

1. Field

One or more exemplary embodiments relate to a method and apparatus for compositing a plurality of images to zoom into an image.

2. Description of the Related Art

In the past, electronic devices were classified by features and functions that are available only on the devices. unlike today's multi-functional devices capable of running a broad range of applications. For example, digital image capturing and processing were performed only by digital cameras. However, the evolution of smartphones has allowed users to enjoy various features, including digital image capturing and processing with a single mobile device.

Digital image capturing and processing have become key features of mobile devices. Users demand mobile devices that are not only small, lightweight, and thin, but also have high performance and high quality capturing and imaging functions.

Since mobility is one of the most important features of the mobile devices, the dimensions and weight of communication components in the mobile devices have been constantly reduced. However, it has become more difficult to reduce these parameters of high performance and high quality lenses since the quality of cameras basically depends on the optical performance of lenses. Also, there is a limitation in improving the quality of the cameras only by performing digital zooming and digital image processing on a single digital image without using the optical functions of the lenses.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments include an image zooming method and an image zooming apparatus for optical zooming by using a plurality of lenses with different focal lengths.

According to an aspect of an exemplary embodiment, an image zooming method includes capturing an identical scene via a plurality of lenses; obtaining a first image and a second image of the identical scene that have different resolving powers; determining a first area of the first image and a second area of the second image which corresponds to the first area; and generating a composite image that comprises the second area and a remaining area of the first image from which the first area is excluded.

A resolving power of the first image may be lower than resolving power of the second image.

The first and the second images have a same size.

The determining may include determining the second area from the second image to represent a same object that is represented by the first area of the first image.

The generating the composite image may include generating the composite image by changing the first area of the first image to the second area.

The generating the composite image may include generating a third area that has a third resolving power between a first resolving power of the first image and a second resolving power of the second image by using the first area and the second area; and generating a composite image by changing the first area of the first image to the third area.

The generating the composite image may include performing a blending process on pixels around a boundary of the remaining area of the first area and the second area.

The plurality of lenses may be prime lenses that have different focal length ranges.

The obtaining of the first and the second images may include capturing the first and the second images with different exposure durations.

The obtaining the first and the second images may include capturing the first and the second images at different timings.

According to one or more exemplary embodiments, an image zooming apparatus includes an image obtaining unit obtaining a first image and a second image that have different resolving powers by capturing an identical scene via different lenses; an area determining unit determining a first area of the first image and a second area of the second image which corresponds to the first area of a first image; and an image compositing unit generating a composite image that comprises the second area and a remaining area of the first image from which the first area is excluded.

According to another aspect of an exemplary embodiment, a digital mobile device includes a plurality of lenses with different resolving power; an image capturing unit configured to generate a first image and a second image that have different resolving powers by capturing an identical scene via the plurality of lenses; an area determining unit configured to determine a first area of the first image and a second area of the second image which corresponds to the first area; and an image compositing unit configured to generate a composite image that comprises the second area and a remaining area of the first image from which the first area is excluded.

According to another aspect of an exemplary embodiment, an image zooming apparatus may include: a first lens having a first modulation transfer function (MTF) curve; a second lens having a second MTF curve that is different from the first MTF curve; and an imaging processor configured to obtain a first image from the first lens and a second image from the second lens, determine a region of interest (ROI) from the first image and a corresponding region from the second image, and generate a composite image by combining the first image and the second image based on the first MTF curve the second MTF curve, wherein the ROI and the corresponding region represent an identical object.

The imaging processor is further configured to generate the composite image by combining the corresponding region of the second image and a remaining region of the first image from which the ROI is excluded.

The imaging processor is further configured to determine a range of distances of the ROI measured from a center of the first image, and combine the corresponding region of the second image and the remaining region of the first image in response to a resolving power value of the second MTF curve being greater than a resolving power of the first MTF curve in the range of distances.

The imaging zooming apparatus may further include a third lens having a third MTF curve that is different from the first and the second MTF curves, and wherein the imaging processor is further configured to generate the composite image based on the first, the second, and the third MTF curves.

According to one or more exemplary embodiments, a non-transitory computer-readable recording medium having recorded thereon a program, which, when executed by a computer, performs the image zooming method.

BRIEF DESCRIPTION OF THE DRAWINGS

The above and/or other aspects will be more apparent by describing certain exemplary embodiments, with reference to the accompanying drawings, in which:

FIG. 8B is a diagram of a process of removing occlusion between images acquired from different viewpoints, the process being performed by an image zooming apparatus according to an exemplary embodiment;

DETAILED DESCRIPTION

Figure 1:
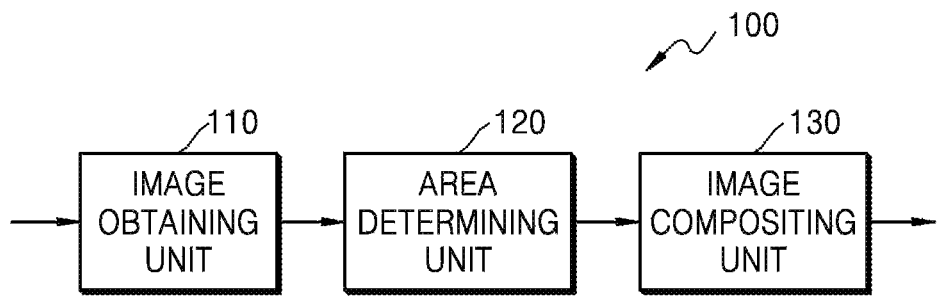
FIG. 1 is a block diagram of an image zooming apparatus using lenses with different focal lengths, according to exemplary embodiments.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

Throughout the specification, it will also be understood that when an element is referred to as being "connected to" another element, it can be directly connected to the other element, or electrically connected to the other element while intervening elements may also be present. Also, when a part "includes" or "comprises" an element, unless there is a particular description contrary thereto, the part can further include other elements, not excluding the other elements. For example, a technology defined as "A may include one selected from a1, a2, and a3" indicates a broad term indicating that an exemplary element that may be included in the element A is a1, a2, or a3.

However, the technology does not imply that the element A is only limited to including a1, a2, or a3. The technology should not be understood in an exclusive sense to indicate that the element A does not include other elements in addition to a1, a2, and a3.

The technology implies that the element A may include a1, a2, or a3. The technology does not absolutely imply that the elements included in the element A are selectively determined from a predetermined group. For example, the technology should not be understood in a narrow sense that only a1, a2, or a3 selected from a group including a1, a2, and a3 is absolutely included in the element A.

Also, according to the present specification, the expression "at least one selected from a1, a2, or (and) a3" indicates one of a1; a2; a3; a1 and a2; a1 and a3; a2 and a3; or a1, a2, and a3.

Therefore, unless clearly defined as "at least one of a1, at least one of a2, or (and) at least one of a3," the expression "at least one selected from a1, a2, or (and) a3" should not be understood as "at least one a1, at least one a2, or (and) at least one a3."

Hereinafter, one or more exemplary embodiments will now be described more fully with reference to the accompanying drawings so that this disclosure will be thorough and complete, and will fully convey the inventive concept to one of ordinary skill in the art. The inventive concept may, however, be embodied in many different forms and should not be construed as being limited to the embodiments set forth herein. Features that are unnecessary for clearly describing the inventive concept are not included in the drawings. Also, throughout the specification, like reference numerals in the drawings denote like elements. Expressions such as "at least one of," when preceding a list of elements, modify the entire list of elements and do not modify the individual elements of the list.

Hereinafter, exemplary embodiments of an image zooming apparatus using lenses with different focal lengths will be described in detail with reference to FIGS. 1 to 10. Also, exemplary embodiments of a method of generating a zooming image or a composite image by using images obtained via the lenses with different focal lengths will be described in detail.

FIG. 1 is a block diagram of an image zooming apparatus 100 using lenses with different focal lengths, according to an exemplary embodiment.

According to the exemplary embodiment, the image zooming apparatus 100 may include an image obtaining unit 110, an area determining unit 120, and an image compositing unit 130. The image zooming apparatus 100 may generate a composite image, which includes image information of different resolutions, by using images obtained via different lenses. Each of the imaging obtaining unit 110, the area determining unit 120, and the imaging compositing unit 130 may be implemented in three separate processors. Alternatively, all operations of the imaging obtaining unit 110, the area determining unit 120, and the imaging compositing unit 130 may be implemented in a single imaging processor.

Resolving power of a lens is different from a resolution of a digital image. The resolving power is a capacity of a lens to produce separate images of close objects such that the objects are optically distinguishable from each other. The resolving power is closely related to contrast, visibility, and sharpness.

The resolution is the number of pixels in an image. A high resolution image has a large number of pixels whereas a low resolution image has a small number of pixels. The resolving power is low when a minimum interval value between two points or between optically distinguishable lines from among black and white lines at equidistant intervals is large, and the resolving power is high when if the minimal interval value is small. Even when images have the same size, an image acquired by a lens having high resolving power may include a large amount of high frequency components, and thus, the image acquired by a lens having high resolving power may have high contrast, improved visibility, and high sharpness. Hereinafter, 'an image acquired by a lens having resolving power' is referred to as 'an image with resolving power.'

Therefore, if the resolving power of an imaging device having a constant resolution is variable, an image of an object may be captured and displayed in detail when the resolving power is high while the object may be displayed in relatively less detail when the resolving power is low. A sharpness of the image with high resolving power may be greater than a sharpness of the image with low resolving power.

Also, the resolving power may be variable according to a distance from a diameter of a lens to a center of the lens. Even in the case of a single lens, an image of an object passing through a point far away from the center of the lens along the diameter of the lens may have lower resolving power than an image of an object passing through the center of the lens. Therefore, central pixels of the image may be determined by light rays passing through the center, and pixels that are far away from the center of the lens may be determined by light rays passing through points far away from the center of the lens. Thus, resolving power is deteriorated when points far away from the center of the image are processed compared to when the central pixels of the image are processed.

The image obtaining unit 110 may obtain a plurality of images of an identical scene captured via different lenses. Although the identical scene is shown in the plurality of images, the plurality of images may have different resolving power since the lenses used to capture the plurality of images have different resolving power. The image obtaining unit 110 may obtain a plurality of images generated via lenses with different focal lengths.

From the plurality of images obtained by the image obtaining unit 110, the area determining unit 120 may determine a first area of a first image and a second area of a second image which corresponds to the first area.

For example, the first image may have a lower resolving power than the second image. For example, even when the first and second images are produced at different resolving powers, the first and second images may have the same size.

For example, when the image zooming apparatus 100 recognizes an input for selecting a zoom ratio, the image obtaining unit 110 may determine at least one lens based on the selected zoom ratio and obtain images captured via the determined at least one lens.

For example, when the first and second areas have different resolving power, the area determining unit 120 may determine from the second image the second area such that the second area includes an object that is the same as an object captured in the first area of the first image.

When the first and second images have the same size and lenses used for capturing each image have the same focal length, the second area of the second image, which corresponds to the first area of the first image, may have the same size as the first area.

However, if the images are captured via lenses having different focal lengths, the second area of the second image may have a different size from the first area. For example, if a first lens used for capturing the first image has a longer focal length than a second lens used for capturing the second image, the second area of the second image may be larger than the first area according to the magnification between the first and second lenses.

The image compositing unit 130 may generate a composite image including different resolving power areas by compositing the first image and the second area of the second image.

For example, the image compositing unit 130 may generate the composite image by changing the first area of the first image to the second area. In other words, the imaging compositing unit 130 may combine the remaining area of the first image, from which the first area is excluded, and the second area of the second image.

As another example, the image compositing unit 130 may generate a third area with third resolving power between the first resolving power of the first image and the second resolving power of the second image by using the first area and the second area. A composite image in which the first area of the first image is changed to the third area may be generated. The third area with the third resolving power may be identical to an area that has acquired by a lens having the third resolving power between the first resolving power and the second resolving power.

A discontinuity may occur at pixels around a boundary between the remaining area of the first image and the second area of the second image when the remaining area and the second area are combined and displayed in the composite image. Therefore, the image compositing unit 130 may perform a blending process on the pixels around the boundary. By performing the blending process, boundary artifact between the remaining area of the first area and the second area may be alleviated.

As another example, the image obtaining unit 110 may obtain a plurality of images captured via lenses by using different exposure durations. The area determining unit 120 may select a third image captured by using a first exposure duration and a fourth image captured by using a second exposure duration, from among the plurality of images captured by using different exposure durations. The area determining unit 120 may determine from the fourth image a fourth area that corresponds to a predetermined object captured in the third image. The image compositing unit 130 may replace an area of the predetermined object in the third image with the fourth area of the fourth image.

As another example, the image obtaining unit 110 may obtain images of an identical scene captured via lenses by using different exposure timings. The images may be obtained by using different exposure timings, lenses having different focal lengths, or both.

By using images with the same resolution but different resolving power, an area that requires high sharpness may be obtained from an image with high resolving power, other areas may be obtained from an image with low resolving power, and thus a composite image may be obtained by combining these areas. Therefore, since only an area with high sharpness may have a large amount of high frequency data and other areas may have a small amount of high frequency data, the image zooming apparatus 100 according to the exemplary embodiments may be able to provide an image that includes important information in an area with high resolving power by using only images with relatively less amount of data.

Hereinafter, a method of obtaining an image at a high resolving power via lenses with different focal lengths will be described in detail with reference to FIGS. 2 to 5.

Figure 2:
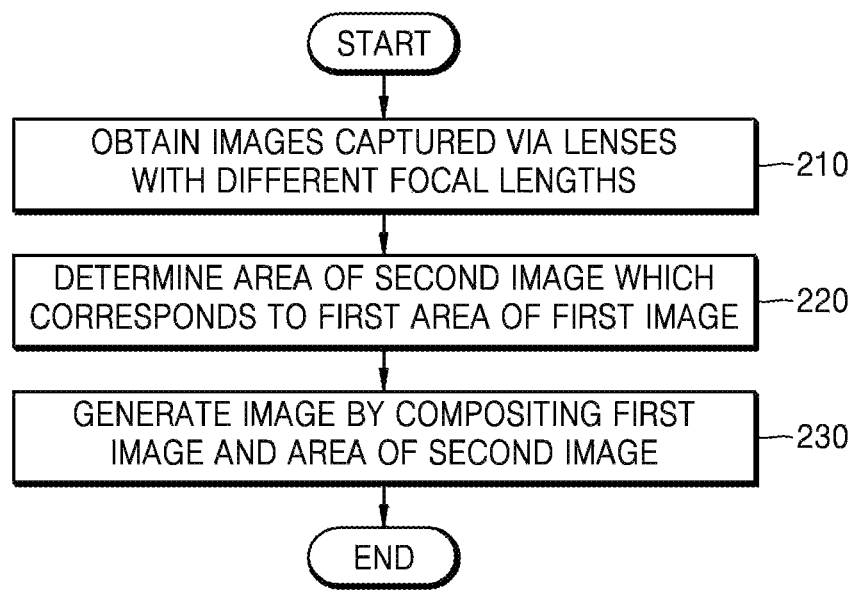
FIG. 2 is a flowchart of an image zooming method according to exemplary embodiments.
Figure 3:
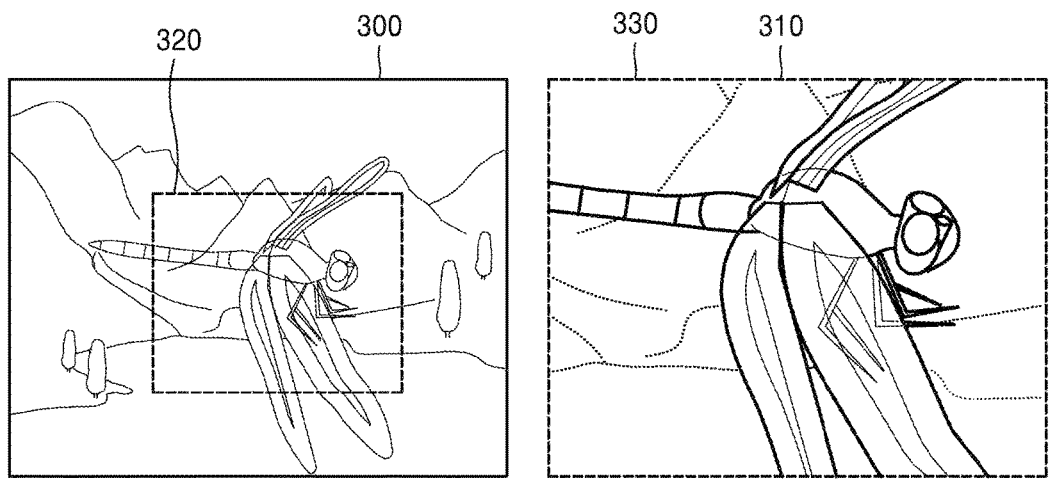
FIG. 3 shows images obtained via lenses with different focal lengths.
Figure 4:
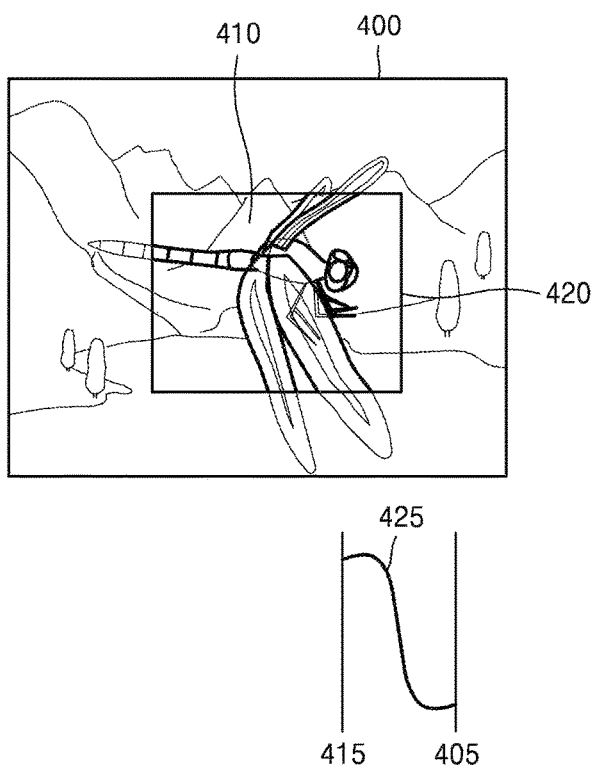
FIG. 4 is a composite image generated by using an image zooming apparatus according to an exemplary embodiment.

FIG. 2 is a flowchart of an image zooming method according to exemplary embodiments. FIG. 3 shows images obtained via lenses with different focal lengths. FIG. 4 is a composite image generated by the image zooming apparatus 100 according to an exemplary embodiment.

In operation 210, the image obtaining unit 110 may obtain images captured via the lenses with different focal lengths. The images may show the same object and have different resolving power. The obtained images may have different resolving power and different sharpness but the same size.

In operation 220, the area determining unit 120 may determine corresponding areas from the images obtained by the image obtaining unit 110. For example, once the area determining unit 120 recognizes that the lenses are focused on a region of interest (ROI), the area determining unit 120 may determine an area corresponding to the ROI from each of the obtained images. The corresponding areas may represent a same object or a same scene with different sharpness.

As shown in FIG. 3, for example, a predetermined object area in a first image 300 captured via a lens with a short focal length may be smaller than a predetermined object area in a second image 310 captured via a lens with a long focal length which corresponds to the predetermined object area in the first image 300.

Therefore, according to a magnification of the first image 300 and the second image 310, the area determining unit 120 may determine a second area 330 in the second image 310 which corresponds to a first area 320 in the first image 300.

Alternatively, since resolving power of the second image 310 is higher than that of the first image 300, the first area 320 in the first image 300 may be determined to correspond to an entire area of the second image 310.

In operation 230, the image compositing unit 130 may composite the second area 330 determined by the area determining unit 120 and the first image 300. The image compositing unit 130 may replace the first area 320 of the first image 300 with the second area 330. In other words, the imaging compositing unit 130 may combine the remaining area of the first image, from which the first area is excluded, and the second area of the second image.

If the first area 320 and the second area 330 have different sizes, the image compositing unit 130 according to an embodiment may reduce a size of the second area 330 to match a size of the first area 320 and generate a substitute image 410. The image compositing unit 130 may replace the first area 320 with the substitute image 410 and thus generate a composite image 400 that is the same as the first image 300 and the second image 310.

The image compositing unit 130 according to another embodiment may enlarge the first image 300 based on the magnification of the first image 300 and the second image 310, and then, replace an enlarged area of the first image 300 with the second area 330. In this case, the image compositing unit 130 may generate the composite image 400, which is enlarged based on the magnification of the first image 300 and the second image 310, on the first image 300 and the second image 310.

When the first area 320 of the first image 300 is replaced with the substitute image 410 during a process of generating the composite image 400, boundary artifact 425 may occur between an external area of the first area 320 in the first image 300 and the substitute image 410. Specifically, the boundary phenomenon 425 wherein a pixel value distribution 415 of the substitute image 410 suddenly changes to a pixel value distribution 405 of the first image 300 may occur around a boundary of the external area of the first area 320 in the first image 300 and the substitute image 410.

In order to reduce the boundary phenomenon 425, the image compositing unit 130 may perform a blending process on a boundary 420 of the external area of the first area 320 in the first image 300 and the substitute image 410. The blending process is not limited to a certain method and various blending methods for adjusting pixel values may be used to reduce a pixel value difference between a predetermined number of pixels in an area facing the substitute image 410 from the boundary 420 and a predetermined number of pixels in an area facing the first image 300 from the boundary 420.

Accordingly, the image compositing unit 130 may generate the composite image 400 that includes an ROI with higher resolving power than the original ROI in the first image 300. A resolving power difference will be described in detail with reference to a modulation transfer function (MTF) graph 500 of FIG. 5.

Figure 5:
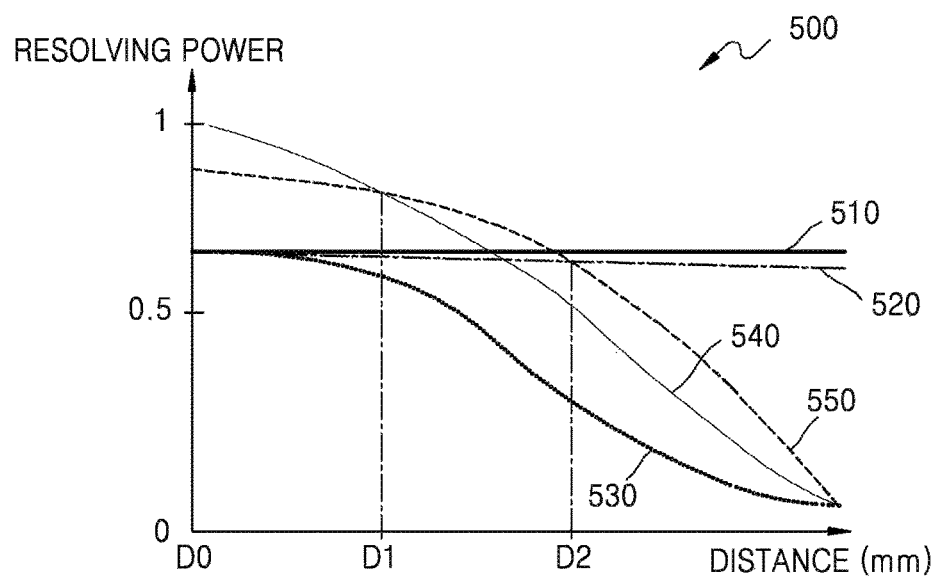
FIG. 5 is a modulation transfer function (MTF) graph of an image generated by digital zooming and images generated in an image zooming apparatus according to an exemplary embodiment.

FIG. 5 is the MTF graph 500 of an image generated by digital zooming and images generated by an image zooming apparatus according to an exemplary embodiment.

The MTF graph 500 shows a curve formed by digitizing variations of resolving power according to distances from a central point of an image. An area distant from the central point of the image is captured by light rays passing through a point apart from a center of a lens. Therefore, a distance from the center of the lens is closely related to a distance from the central point of the image. Likewise, resolving power of an image obtained from each point of the lens may be understood as being resolving power of each point of the lens.

An x-axis of the MTF graph 500 indicates the distance from the central point of the image, and the origin of the x-axis indicates the central point of the image. A y-axis of the MTF graph 500 indicates normalized indexes of the resolving power of each point of the lens.

An area captured through the central point of the image has the highest resolving power. Theoretically, the resolving power is constant regardless of a distance from the central point of the image. Therefore, the resolving power of a lens does not change as the distance from the central point increases.

However, the resolving power is observed as decreasing as a distance from the central point of the image increases in the real world, as shown in FIG. 5. Specifically, the resolving power decreases as a distance from the central point of the image increases in a first MTF curve 520 of an image actually obtained by an optical lens. The resolving power decreases more rapidly in an MTF curve 530 of an image obtained by digital zooming than in the first MTF curve 520 related to the optical lens.

The image zooming apparatus 100 according to an embodiment may generate a composite image by using the first image 300 and the second image 310 that are obtained via lenses with different focal lengths.

If resolving power of a first lens used to obtain the first image 300 is shown as the first MTF curve 520, resolving power of a second lens used to obtain the second image 310 may be shown as a second MTF curve 540.

The first MTF curve 520 and the second MTF curve 540 are compared below. A second lens has higher resolving power than a first lens at the central point of the image. The second lens has higher resolving power than the first lens inside a range of a certain distance from the central point of the image.

Therefore, if the first image 300 obtained via the first lens is replaced with the second image 310 obtained via the second lens, resolving power of the substitute image 410 in the composite image 400 may be increased as the second MTF curve 540.

Resolving power of a zoom image, which is captured by adding a digital zooming operation to a composition operation of the first and second images 300 and 310, may be shown as a third MTF curve 550. The first MTF curve 520, the second MTF curve 540, and the third MTF curve 550 are compared as below. Resolving power of a third image obtained by digital zooming is less than that of the second lens but higher than that of the first lens. Resolving power of an area 310 with high resolving power in the zoom image 330 may be lower than the resolving power of the substitution image 410 in the composite image 400. However, a size of the area 310 with high resolving power in the zoom image 330 may become larger than a size of the substitute area 410 by the zooming operation.

Therefore, the image zooming apparatus 100 according to an embodiment may change the first area 320, which is a portion of the first image 300 captured via the lens with low resolving power, to the second area 300 of the second image 310, which is captured via the lens with high resolving power based on the first MTF curve 520 and the second MTF curve 530. Thus, an ROI of the first image 300 with the low resolving power may be changed to the second area 330 with the high resolving power. The image zooming apparatus 100 may store a composite image generated by using areas with different resolving power in a data format that is different from a data format of the first image 300.

When the image zooming apparatus 100 generates a composite image, embodiments are not limited to using the first lens and the second lens. Upon the area determining unit 120 determines a distance or a range of distances of an ROI from the center of the image, the image compositing unit 130 may select two or more lenses based on a result of the determination. For example, if the area determination unit 120 determines that the range of distances of the ROI is between D1 and D2, the image compositing unit 130 may use an image obtained from the third lens in generating the ROI area of a composite image because the third MTF curve 550 has a higher resolving power than the first and second MTF curves 520 and 550 between D1 and D2. The image compositing unit 130 may use an image obtained from the first lens or the second lens in generating the remaining area of the composite image. Likewise, if the area determination unit 120 determines that the range of distances of the ROI is between D0 and D1, the image compositing unit 130 may use an image obtained from the second lens in generating the ROI area because the second MTF curve 540 has a higher resolving power than the second and third MTF curves 550 and 550 between D0 and D1. In this case, the image compositing unit 130 may use an image obtained from the first lens or the third lens in generating the remaining area of the composite image. In sum, when the imaging compositing unit 130 combines images, the image compositing unit 130 may select the images from those obtained from different lenses based on MTF curves of the lenses.

The image zooming apparatus 100 may not change an entire image with low resolving power to an image with high resolving power, but only change portions of the image with low resolving power to the image with high resolving power. Accordingly, a relatively small computational amount may be required for image composition, a data amount of a composite image may be reduced, and an ROI may be changed to an image with high resolving power. Therefore, high resolving power information may be provided from an ROI that is necessary for the user.

Hereinafter, various exemplary embodiments for generating a composite image by using a mobile communication device including an image zooming apparatus 60 will be described in detail with reference to FIGS. 6 to 10.

Figure 6:
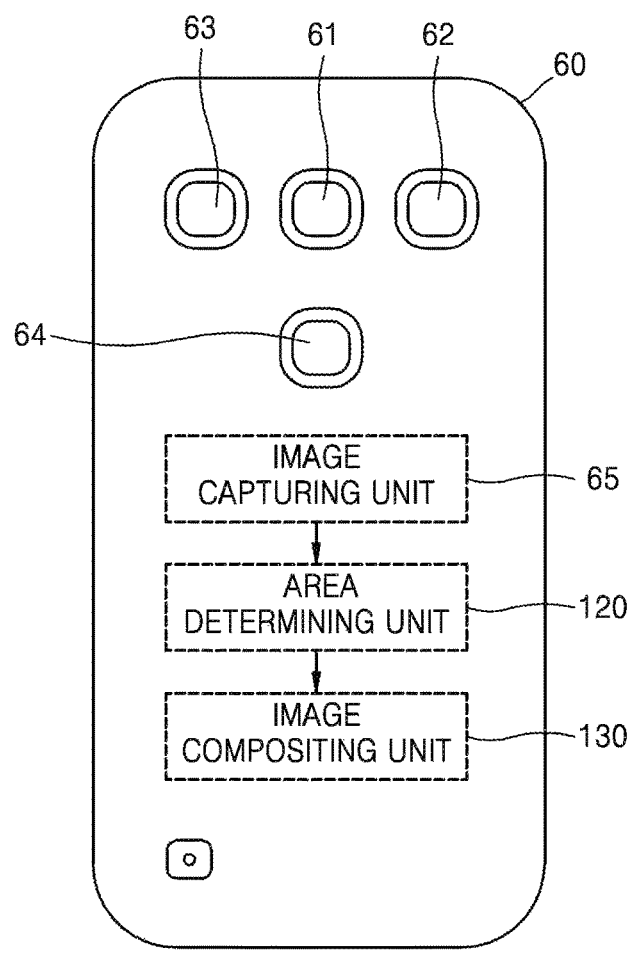
FIG. 6 is an image zooming apparatus implemented in a mobile communication device, according to an exemplary embodiment.

FIG. 6 shows the image zooming apparatus 60 implemented in a mobile communication device, according to an exemplary embodiment.

The image zooming apparatus 60 according to an embodiment may include an image capturing unit 65, the area determining unit 120, and the image compositing unit 130. Also, the image zooming apparatus 60 may include a plurality of lenses 61, 62, 63, and 64.

The image capturing unit 65 of the image zooming apparatus 60 may capture an image of an object via the plurality of lenses 61, 62, 63, and 64. The image capturing unit 65 corresponds to an example of the image obtaining unit 110 of FIG. 1 as the image capturing unit 65 directly obtains a captured image. The area determining unit 120 and the image compositing unit 130 of the image zooming apparatus 60 may perform operations described above with reference to FIGS. 1 to 5, and thus, detailed descriptions of the area determining unit 120 and the image compositing unit 130 will not be repeated.

Although the image zooming apparatus 60 is a mobile communication device in FIG. 6, that is only an example of the image zooming apparatus 60 according to various embodiments, and the image zooming apparatus 60 should not be limited thereto. Embodiments of the image zooming apparatus 60 may not be limited to a mobile communication device including a digital camera, and include a general digital camera, a digital camera capable of mobile communication, a healthcare device including a digital camera, and other various computing devices including a digital camera.

The image zooming apparatus 60 may generate a composite image that includes areas having different focal lengths by using images obtained via a plurality of lenses with different focal lengths. In detail, for example, the image zooming apparatus 60 may use a first image obtained via a lens with low resolving power and a second image obtained via a lens with high resolving power, and change a portion of the first image to a corresponding portion of the second image.

Accordingly, the image zooming apparatus 60 may zoom in on an ROI by replacing the ROI in the image with low resolving power to the image with high resolving power, without using a digital zoom function or a zooming lens. Also, since a low resolution ROI is replaced with an image obtained via the lens with high resolving power, resolving power of the ROI may be higher than that of an ROI of an image enlarged by using the digital zoom function.

The image zooming apparatus 60 according to an embodiment may include a user input interface for obtaining user input signals. The user input interface may detect various touch operations performed using a finger or a manipulation tool, for example, touching, dragging, flicking, swiping, or pinching. Also, a finger input or a manipulation tool input may include a touch input or a button input, but is not limited thereto.

For example, a "touch input" refers to a touch gesture and the like performed on a touch screen by using a manipulation tool to input a control command into the image zooming apparatus 60. For example, the touch input exemplified in the present specification may include, but is not limited to, tapping, touching and holding, double tapping, dragging, panning, flicking, and dragging and dropping.

Also, a "button input" in the present specification refers to an input from a user to control the image zooming apparatus 60 by using a physical button provided on the image zooming apparatus 60 or a manipulation tool.

Figure 7:
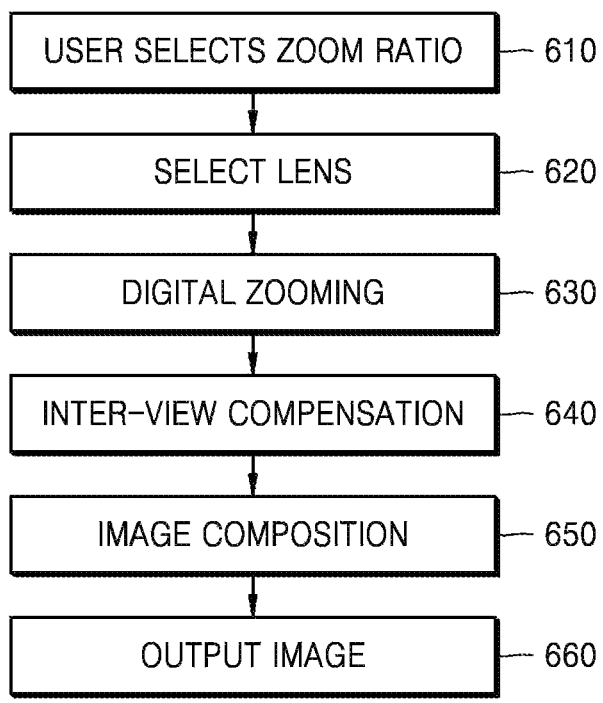
FIG. 7 is a flowchart of a method of compositing images generated by using different lenses, the method being performed by an image zooming apparatus according to an exemplary embodiment.

FIG. 7 is a flowchart of a method of compositing images generated by using different lenses, which may be performed by the image zooming apparatus 60 according to an exemplary embodiment.

In operation 610, the image zooming apparatus 100 may receive from a user an input signal for selecting a zoom ratio. In operation 620, based on the zoom ratio received from the user, the image zooming apparatus 100 may determine a lens to be currently used from the plurality of lenses 61, 62, 63, and 64.

The image zooming apparatus 100 may determine in advance, based on the zoom ratio received from the user, lenses to be selected. For example, in order to generate a composite image of an x A zoom ratio, an image obtained via an A0 lens and an image obtained via an A1 lens may be used from among obtained images. A standard for determining a lens selected based on the zoom ratio may be a focal length of each lens and magnification of focal lengths of two lenses.

Accordingly, a look-up table, which includes a matching relationship between lenses to be selected according to the zoom ratio of a result image, may be stored in the image zooming apparatus 100. The image zooming apparatus 100 may use the look-up table to determine lenses that correspond to the zoom ratio selected by the user from among the plurality of lenses 61, 62, 63, and 64. Thus, the image zooming apparatus 100 may obtain a first lens image and a second lens image based on the zoom ratio selected by the user.

In operation 630, the image zooming apparatus 60 may perform digital zooming on selected lens images according to the zoom ratio. Digital zooming may be performed by using an interpolation method, for example, linear interpolation, bilinear interpolation, spline interpolation, polynomial interpolation, exponential interpolation, or upsampling.

An image captured via a lens with a short focal length may be enlarged by digital zooming according to a zoom ratio. An image captured via a lens with a long focal length may be reduced by digital zooming according to the zoom ratio.

Also, the first and second lens images may be obtained via different lenses, and a difference may exist between viewpoints of the different lenses. Therefore, in operation 640, inter-view compensation may be performed on the first and second lens images. An embodiment regarding performance of the inter-view compensation will be described with reference to FIGS. 8A and 8B.

In operation 650, the image zooming apparatus 60 may generate a composite image by using the first and second images obtained by finishing the digital zooming in operation 630 and the inter-view compensation in operation 640. As described above with reference to FIGS. 1 to 5, the composite image may be generated by changing only a central area of the first lens image to the second lens image with high resolving power. In operation 660, the image zooming apparatus 60 may output the composite image of which resolving power is increased by the image composition performed in operation 650.

Figure 8A:
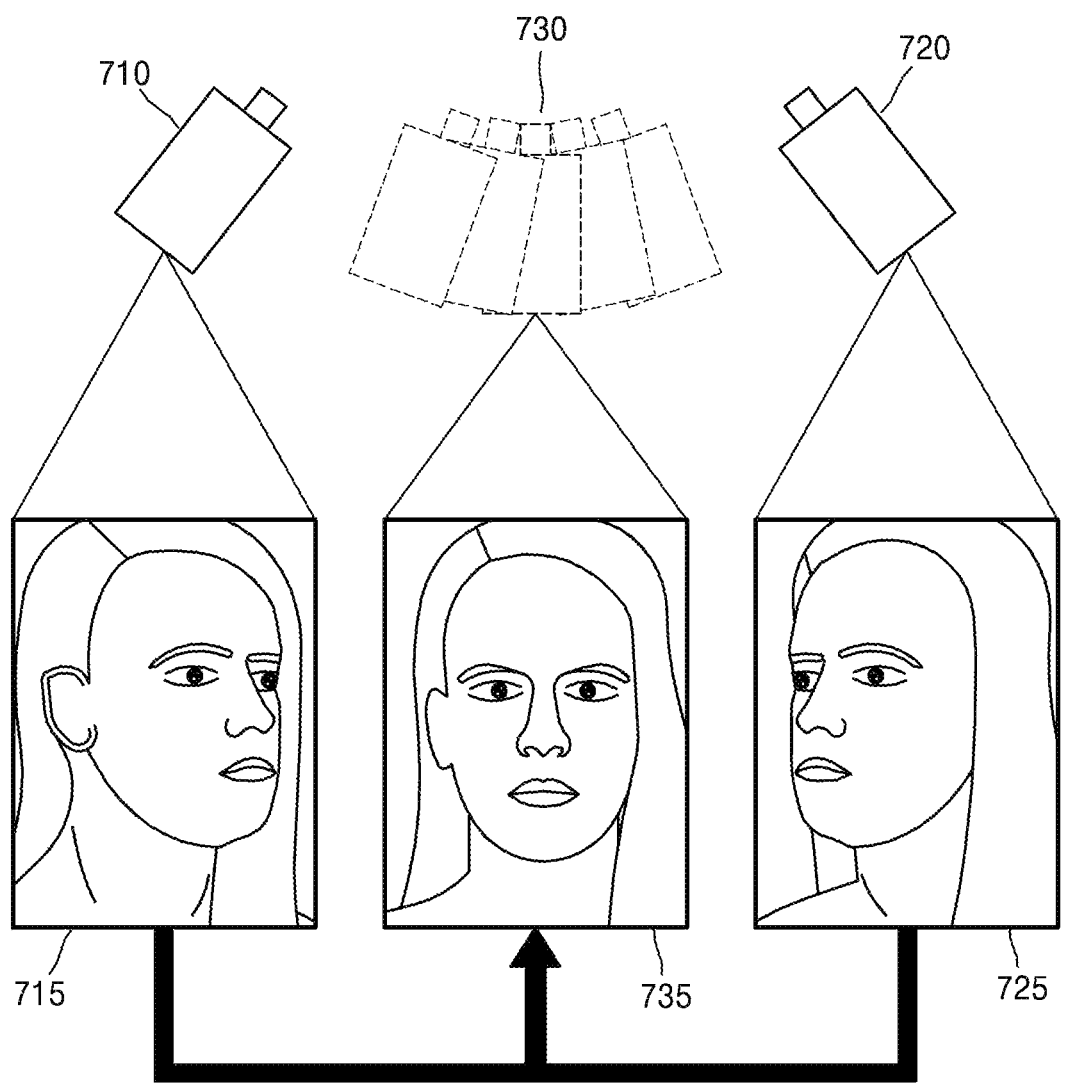
FIG. 8A is a diagram of a process of compositing images acquired from different viewpoints by using different lenses, the process being performed by an image zooming apparatus according to an exemplary embodiment.

FIG. 8A is a diagram of a process of compositing images with different viewpoints by using different lenses, which may be performed by the image zooming apparatus 60 according to an exemplary embodiment.

An operation, performed by the image zooming apparatus 60 to obtain images via a left lens 61 and a right lens 62 from among the plurality of lenses 61, 62, 63, and 64, may be the same as an operation of obtaining a left viewpoint image 715 and a right viewpoint image 725 by using a left camera 710 and a right camera 720.

When inter-view compensation, morphing, or the like is performed on the left viewpoint image 715 or the right viewpoint image 725, an imaginary viewpoint image 735, which may be assumed as an image obtained by an imaginary viewpoint camera 730 disposed between a left viewpoint and a right viewpoint, may be generated.

Therefore, the image zooming apparatus 60 may generate a first imaginary viewpoint image by performing inter-view compensation on a first lens image obtained via the left lens 61. Also, the image zooming apparatus 60 may generate a second imaginary viewpoint image by performing inter-view compensation on a second lens image obtained via the right lens 62.

An imaginary viewpoint does not have to be always exactly in the middle between the left viewpoint and the right viewpoint. The left and right viewpoints may be asymmetrically distributed based on the imaginary viewpoint. Therefore, the imaginary viewpoint images may be generated by performing asymmetrical inter-view compensation on a left viewpoint image and a right viewpoint image obtained from an asymmetrical viewpoint.

As another example, the image zooming apparatus 60 may not adjust a viewpoint of the first lens image but perform inter-view compensation on the second lens image such that a viewpoint of the second lens image matches the viewpoint of the first lens image. Therefore, an image with a viewpoint of the first lens may be generated from the second lens image.

Therefore, images with different resolving power but the same viewpoint may be generated from the first and second lens images.

FIG. 8B is a diagram of a process of removing an occlusion between images with different viewpoints by using the image zooming apparatus 60 according to an exemplary embodiment.

Occlusion may occur in inter-view compensation between a left viewpoint image 800 and a right viewpoint image 810. The occlusion refers to an area that may be captured via a left lens but is not visible via a right lens or an area that may be captured via a right lens but is not visible via a left lens.

In order to eliminate the occlusion, an occlusion in each image may be filled by obtaining image information (for example, pixel values) of an occlusion of a current image from an area of another image which corresponds to the occlusion of the current image. The current image and the other image may be any one selected from the left viewpoint image 800 and the right viewpoint image 810. The process above may be referred to as an occlusion hole filling method.

The occlusion may be eliminated by using other methods. A wide angle lens may capture a nearby object and a telephoto lens may capture a distant object. An occlusion may be large if a lens is near an object and small if the lens is far away from the object. Therefore, an area that is shown as an occlusion in an image captured via the wide angle lens with a short focal length may be visible in an image captured via the telephoto lens with a long focal length.

Therefore, in a dual lens structure, in which telephoto lenses are disposed at left and right sides of a wide angle lens, an occlusion of a current image may be restored by obtaining image information of the occlusion of the current image captured via the wide angle lens from images obtained via the telephoto lenses.

As shown in FIGS. 7, 8A, and 8B, examples of using a first lens image, a second lens image, or both based on a zoom ratio selected by a user have been described. However, operations of the image zooming apparatus 60 are not limited to an embodiment of generating a single zoom image by using two lens images. Other than the embodiment of generating a single zoom image by using two lens images, it is possible to select three or more lens images to generate a composite image.

Also, each of the plurality of lenses 61, 62, 63, and 64 may be a prime lens whose focal length is fixed, or at least one of the plurality of lenses 61, 62, 63, and 64 may be a zoom lens that may zoom in and out within a limited range. Also, in order to reduce sizes and weights of the plurality of lenses 61, 62, 63, and 64, the plurality of lenses 61, 62, 63, and 64 may include thin lenses manufactured by using folded optics.

Hereinafter, various composite applications of images that may be provided by the image zooming apparatus 60 according to various exemplary embodiments will be described with reference to FIGS. 9 and 10.

Figure 9:
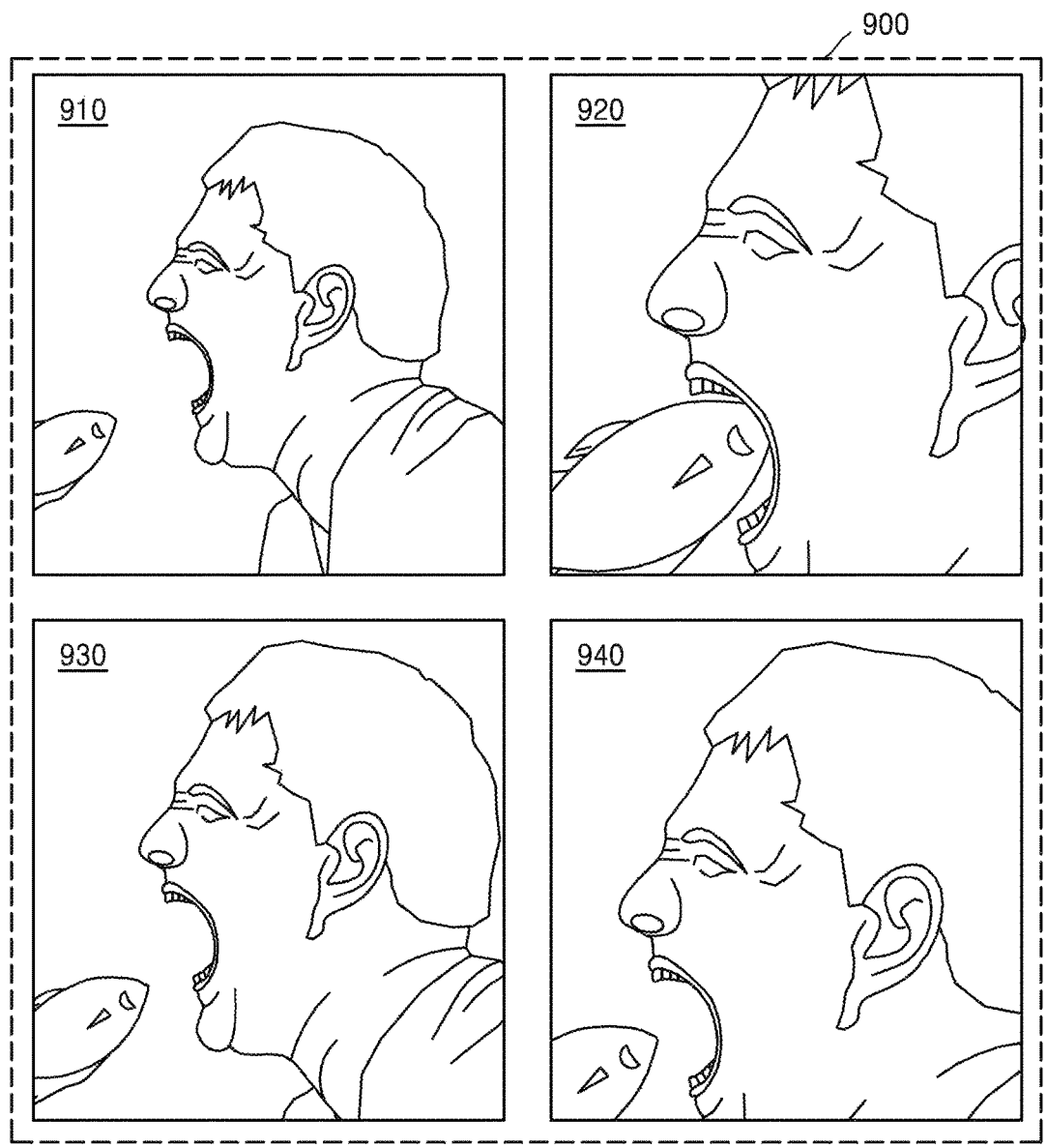
FIG. 9 shows images acquired with different focal lengths by an image zooming apparatus according to another exemplary embodiment.

FIG. 9 shows images with different focal lengths obtained by using the image zooming apparatus 60 according to another exemplary embodiment.

The image zooming apparatus 60 may capture a plurality of images via lenses with different focal lengths. Also, the image zooming apparatus 60 may capture images via lenses by using different exposure timings.

The image zooming apparatus 60 may capture a plurality of images 910, 920, 930, and 940 via four lenses that have at least one selected from different focal lengths and by using different exposure timings. That is, since not only the focal lengths, but also the exposure timings are different, the plurality of images 910, 920, 930, and 940 may be obtained by using different timings.

Also, a composite image 900, in which the plurality of images 910, 920, 930, and 940 captured via the four lenses are arranged, may be generated. Although the plurality of images 910, 920, 930, and 940 arranged in the composite image 900 shown in FIG. 9 have the same size, images arranged in a composite image may have different sizes according to lens magnification.

Also, a plurality of images may not only be vertically or horizontally arranged in a composite image, but also, at least three obtained images may be sequentially arranged in a zigzag direction in a composite image.

Figure 10:
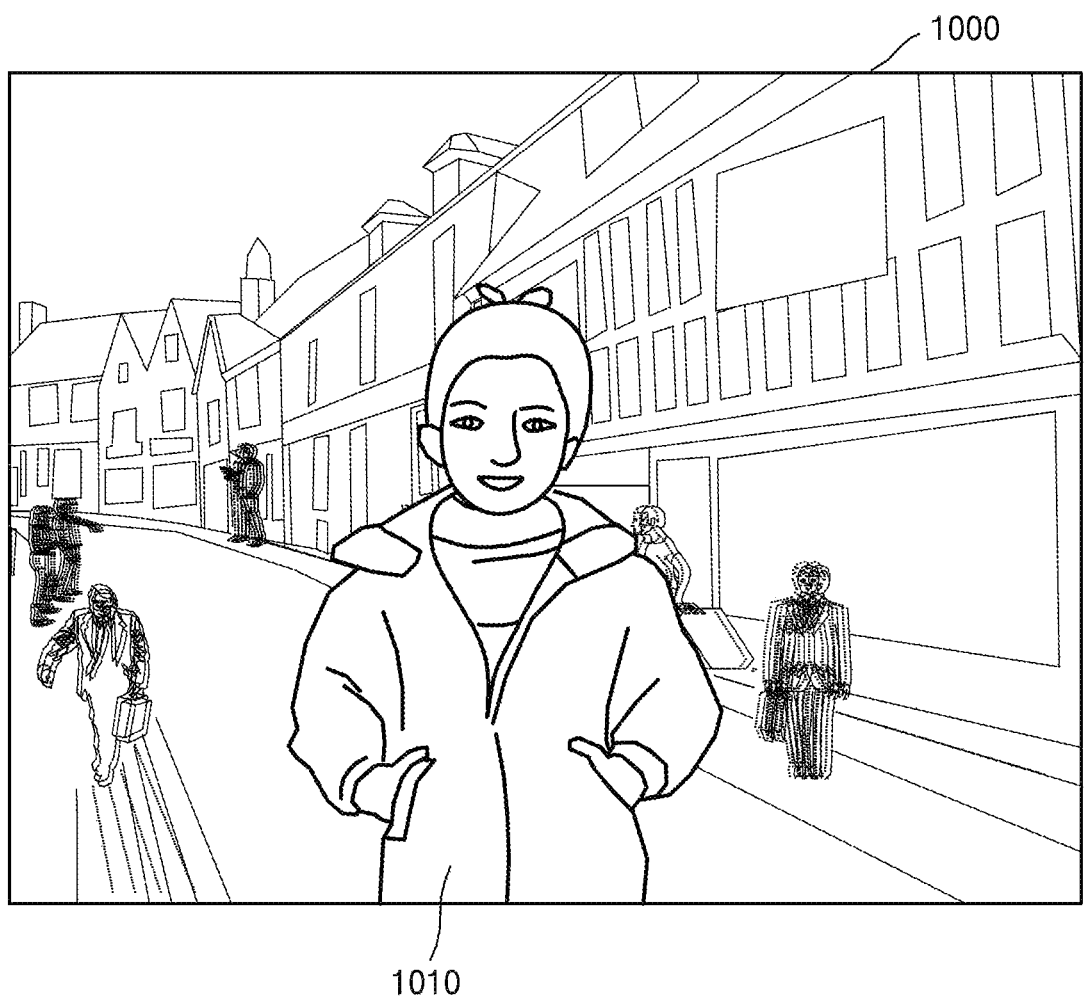
FIG. 10 is a composite image obtained by compositing images acquired with different exposure durations by an image zooming apparatus according to another exemplary embodiment.

FIG. 10 is a composite image 1000 obtained by compositing images captured via the image zooming apparatus 60 by using different exposure durations, according to another exemplary embodiment.

According to the present embodiment, the image zooming apparatus 60 may obtain two images captured via two lenses by using different exposure durations. A first image may be obtained by assigning a long exposure duration to a first lens, and a second image may be obtained by assigning a short exposure duration to a second lens.

Afterimages of moving objects may be shown in the first image due to the long exposure duration. Compared to the first image, the second image may be dark due to the lack of light caused by the short exposure duration.

For example, the image zooming apparatus 60 may adjust brightness of the first and second images according to a difference between an amount of light of the first and second lenses.

As another example, the image zooming apparatus 60 may adjust viewpoints of the first and second images with regard to a difference between positions of the first and second lenses, and thus generate two images acquired from the same viewpoint.

The image zooming apparatus 60 may generate the composite image 1000, in which a predetermined object in the first image is replaced with an object 1010 in the second image, wherein the object 1010 is the same as the predetermined object.

According to the descriptions above, the image zooming apparatuses 100 and 60 described with reference to FIGS. 1 to 10 may generate images obtained via lenses with different focal lengths, replace an ROI of an image with low resolving power with an image obtained by optical zooming, and thus, obtain a composite image including an image with higher resolving power than that of an image obtained by digital zooming in the ROI.

Also, a heterogeneous zooming image, which includes zooming images with different resolving power, may be generated by using lenses with different focal lengths. Also, a heterogeneous zooming image acquired from an imaginary viewpoint may be generated by performing asymmetrical inter-view compensation based on a difference between various lenses.

The above-described block diagrams may be construed by one of ordinary skill in the art that they conceptually express circuits for implementing the principles of exemplary embodiments. Similarly, it would be obvious to one of ordinary skill in the art that a flowchart, a status transition view, a pseudo-code, or the like, may be substantially expressed in a computer-readable medium to denote various processes which can be executed by a computer or a processor whether or not the computer or the processor is clarified or not. Thus, the foregoing exemplary embodiments may be created as computer-executable programs and implemented in a general digital computer executing the programs by using a computer-readable recording medium. The computer-readable medium may include recording media, such as magnetic storage media (e.g., ROM, floppy disks, or hard disks) and optical recording media (e.g., CD-ROMs, or DVDs).

Operations of various elements illustrated in the drawings may be provided by the use of dedicated hardware as well as by hardware which is related to appropriate software and can execute the software. When provided by a processor, such operations may be provided by a single dedicated processor, a single shared processor, or a plurality of individual processors which can share some of the operations. Also, the stated use of terms "processor" or "controller" should not be construed to exclusively designate hardware which can execute software and may tacitly include digital signal processor (DSP) hardware, a ROM for storing software, a RAM, and a non-volatile storage device, without any limitation.

In the claims, elements expressed as units for performing particular functions may cover a certain method performing a particular function, and such elements may include a combination of circuit elements performing particular functions, or software in a certain form including firmware, microcodes, or the like, combined with appropriate circuits to perform software for performing particular functions.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments. While one or more exemplary embodiments have been described with reference to the figures, it will be understood by those of ordinary skill in the art that various changes in form and details may be made therein without departing from the spirit and scope as defined by the following claims.

What is claimed is:

1. An image zooming apparatus comprising:
a first lens having a first modulation transfer function (MTF) curve;
a second lens having a second MTF curve that is different from the first MTF curve; and
an imaging processor configured to obtain a first image from the first lens and a second image from the second lens, determine a region of interest (ROI) from the first image and a corresponding region from the second image, and generate a composite image by combining the first image and the second image, wherein the ROI and the corresponding region represent an identical object.

2. The imaging zooming apparatus of claim 1, wherein the imaging processor is further configured to generate the composite image by combining the corresponding region of the second image and a remaining region of the first image from which the ROI is excluded.

3. The imaging zooming apparatus of claim 2, wherein the imaging processor is further configured to determine a range of distances of the ROI measured from a center of the first image, and combine the corresponding region of the second image and the remaining region of the first image in response to a resolving power value of the second MTF curve being greater than a resolving power of the first MTF curve in the range of distances.

4. The imaging zooming apparatus of claim 2, further comprising a third lens having a third MTF curve that is different from the first and the second MTF curves, and wherein the imaging processor is further configured to generate the composite image based on the first, the second, and the third MTF curves.

* * * * *